United States Patent [19]
Ho

[11] Patent Number: 5,357,900
[45] Date of Patent: Oct. 25, 1994

[54] PORTABLE CAGE FOR PETS

[76] Inventor: Ying-Kuan Ho, No.22, Alley 18, Lane 75, An Ping Road, Tainan, Taiwan

[21] Appl. No.: 104,633
[22] Filed: Aug. 11, 1993
[51] Int. Cl.$^5$ .............................. A01K 1/03
[52] U.S. Cl. .................................. 119/19
[58] Field of Search .................. 119/17, 19, 15

[56] References Cited

U.S. PATENT DOCUMENTS

| | | | |
|---|---|---|---|
| 3,234,908 | 2/1966 | Doskocil | 119/19 |
| 3,490,417 | 1/1970 | Swinney | 119/19 |
| 4,319,545 | 3/1982 | Son | 119/17 |
| 4,484,540 | 11/1984 | Yamamoto | 119/19 |
| 5,010,848 | 4/1991 | Rankin | 119/19 |
| 5,092,270 | 3/1992 | Simons et al. | 119/19 |
| 5,154,137 | 10/1992 | Stanaland | 119/19 |

*Primary Examiner*—Gene Mancene
*Assistant Examiner*—Todd E. Manaha
*Attorney, Agent, or Firm*—Bacon & Thomas

[57] ABSTRACT

A cage includes a base having an opening and two accesses and a cover having an opening and two accesses aligned with the opening and the accesses of the base. A door is pivotally coupled between the base and the cover for enclosing the opening, two grids engaged in the accesses of the base and the cover, and two lids each having two halves pivotally coupled together. The cage includes a pan disposed in the bottom portion for collecting discharges of pets, and the cage can be easily assembled.

2 Claims, 4 Drawing Sheets

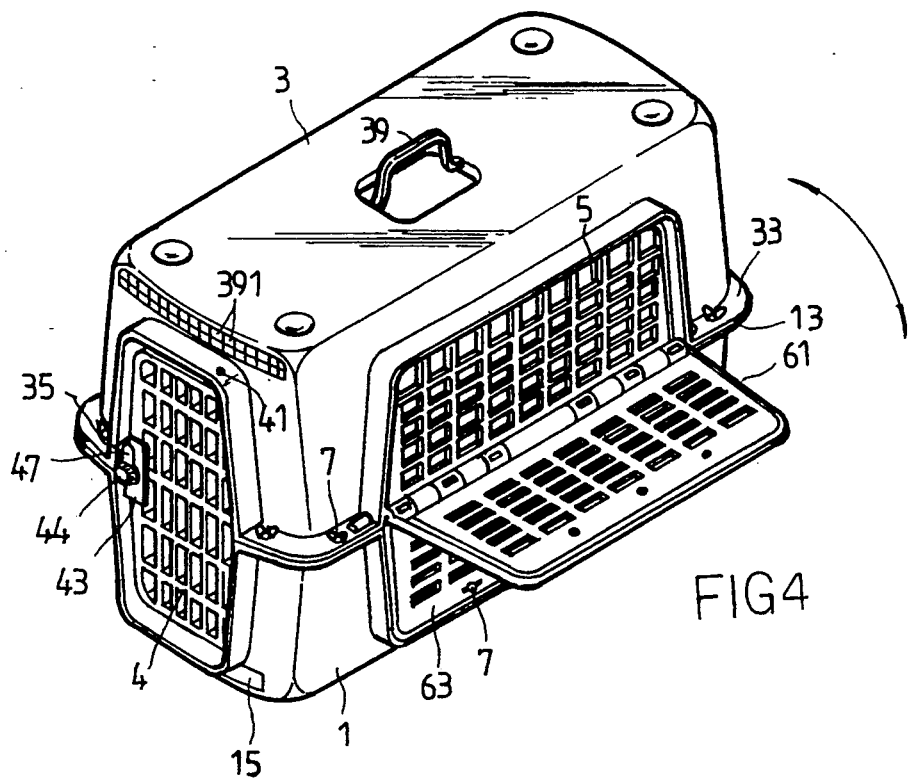
FIG 4
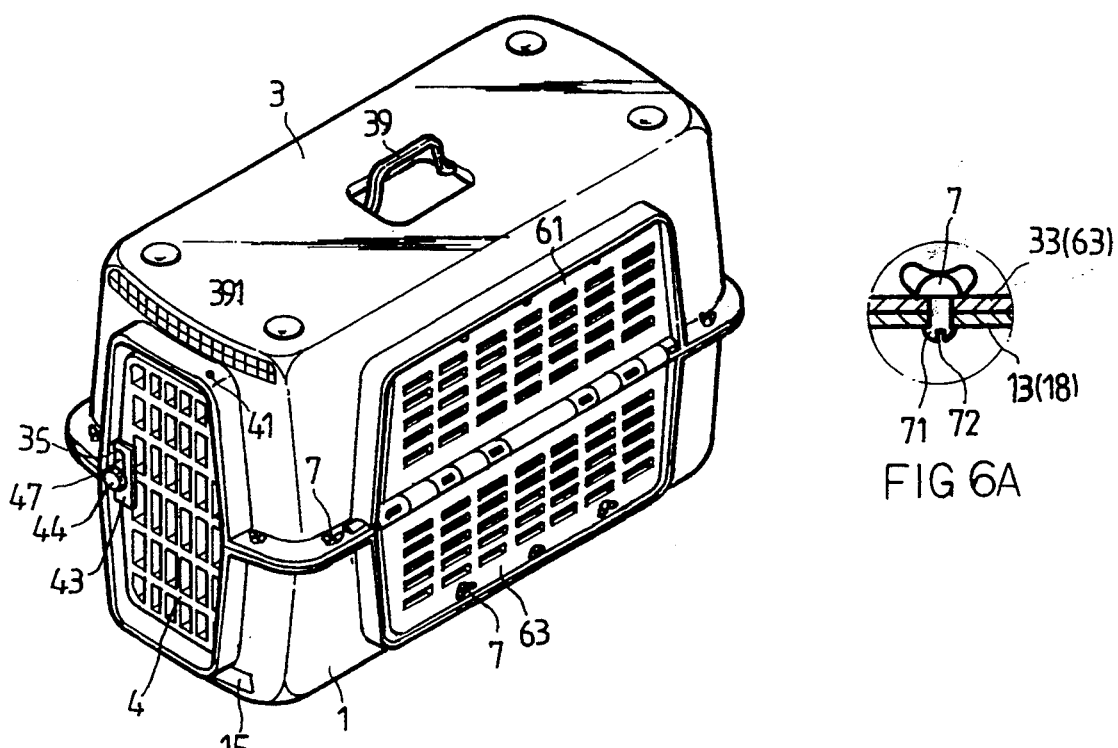
FIG 6
FIG 6A

PORTABLE CAGE FOR PETS

BACKGROUND OF THE INVENTION

1. Field of the Invention

The present invention relates to a cage, and more particularly to a portable cage for pets.

2. Description of the Prior Art

Typical cages for pets are provided for receiving the pets only, however no means are provided for receiving the discharges of the pets.

The present invention has arisen to mitigate and/or obviate the afore-described disadvantages of the conventional cages for pets.

SUMMARY OF THE INVENTION

The primary object of the present invention is to provide a portable cage for pets in which means are provided for receiving the discharges of pets.

The other objective of the present invention is to provide a portable cage for pets in which the cage can be easily assembled.

In accordance with one aspect of the invention, there is provided a cage comprising a base including a front portion having a first opening formed therein, two side portions each having a first access formed therein, two first recesses oppositely formed in an upper portion of each of the first accesses, a first slot and a first bar formed in a bottom portion of each of the first accesses; a cover including a front portion having a second opening formed therein and two side portions each having a second access formed therein, two second recesses oppositely formed in a lower portion of each of the second accesses, a cavity formed in one side of the second opening, a second slot and a second bar formed in an upper portion of each of the second accesses; a door including a plurality of holes formed therein and pivotally coupled between the base and the cover for closing the first opening and the second opening, a board fixed on the door, a knob having an extension engaged into the board and the door, the knob including a catch extended therefrom for engaging with the cavity of the cover so as to retain the door in a closed position; two grids engaged with the first slots of the base and the second slots of the cover for closing the first accesses of the base and the second accesses of the cover, respectively, and for allowing air to enter into the cage; two lids each including two halves pivotally coupled together by a shaft, the shaft including two end portions rotatably received in the first and second recesses, the two halves of the lids being engaged with the first bars and the second bars; and means for fixing the two halves of the lids to the first bars and the second bars.

Further objectives and advantages of the present invention will become apparent from a careful reading of the detailed description provided hereinbelow, with appropriate reference to the accompanying drawings.

BRIEF DESCRIPTION OF THE DRAWINGS

FIG. 4 is a perspective view of the portable cage, in which a window is opened;

FIG. 6 is a perspective view of the cage; and

DETAILED DESCRIPTION OF THE PREFERRED EMBODIMENT

Figure 1:
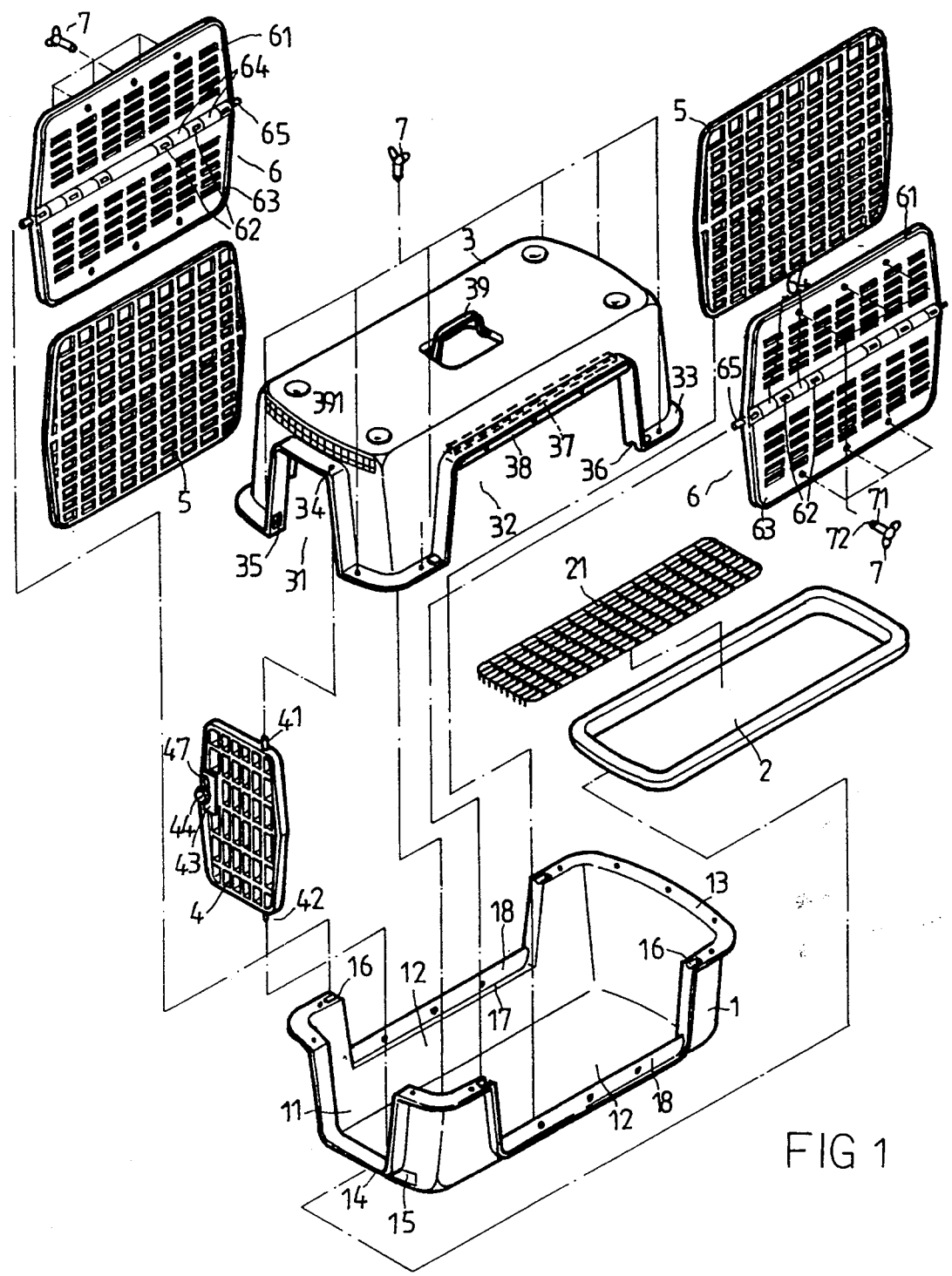
FIG. 1 is an exploded view of a portable cage for pets in accordance with the present invention.
Figure 2:
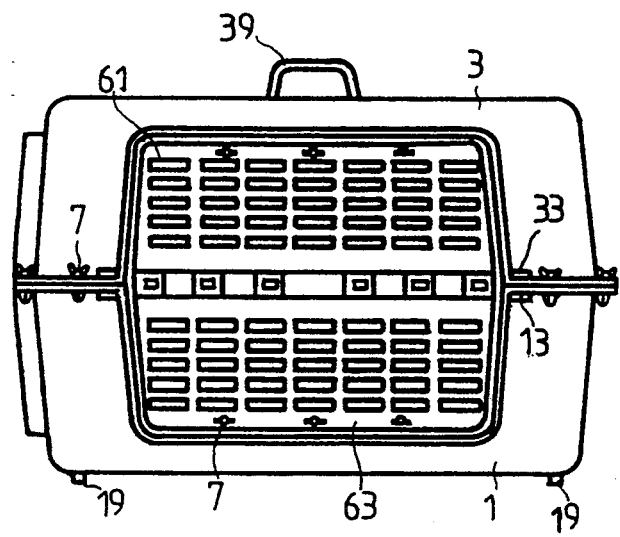
FIG. 2 is a side view of the portable care.

Referring to the drawings, and initially to FIGS. 1, 2 and 4, a portable cage for pets in accordance with the present invent ion comprises a base 1 including a front portion having an opening 11 formed therein and two side portions each having an access 12 formed therein, a flange 13 extended outward from the upper peripheral portion thereof, a hole 14 formed in the bottom portion of the opening 11, and an oblong hole 15 formed below the opening 11. Each of the accesses 12 has two side portions each having a recess 16 formed in the upper portion thereof, a slot 17 anti a bar 18 formed in the bottom portion of each of the accesses 12. Four pads 19 are provided in the bottom of the base 1. A pan 2 is inserted into the bottom portion of the base 1 via the oblong hole 15, and a grate or grid 21 is disposed in the pan 2.

A cover 3 is formed of a shape similar to the base 1 and includes a front portion having an opening 31 formed therein and two side portions each having an access 32 formed therein, a flange 33 extended outward from the lower peripheral portion thereof, a hole 34 formed in the upper portion of the opening 31, and a cavity 35 formed in one side of the opening 31. Each of the accesses 32 has two side portions each having a recess 36 formed in the lower portion thereof, a slot 37 and a bar 38 formed in the upper portion of each of the accesses 32. A handle 39 are provided in the top portion of the cover 3. A plurality of apertures 391 are provided in the front portion of the cover 3 and are located above the opening 31 for allowing air flowing into the cover 3.

Figure 3:
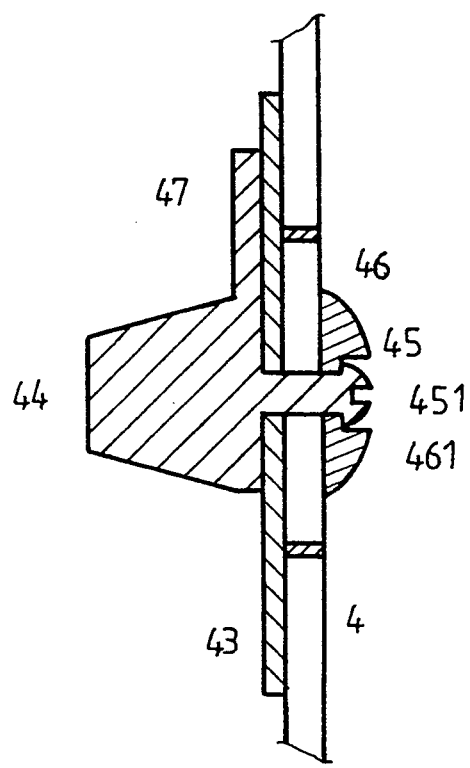
FIG. 3 is a partial cross-sectional view illustrating part of the door.

A door 4 having a plurality of holes formed therein includes two stubs 41, 42 extended upward and downward therefrom for engaging with the holes 14, 34 of the base 1 and the cover 3 respectively such that the door 4 can be pivotally coupled to the base 1 and the cover 3 in order to close the openings 11, 31. A board 43 is fixed on the door 4, as shown in FIG. 3, a knob 44 having an extension 45 extends into the board 43 and the door 4 and has an enlarged head engaged in the depression 461 of a washer 46, the enlarged head of the extension 45 having a split 451 formed therein such that the enlarged head can be engaged through the board 43, the door 4 and the washer 46. The knob 44 further includes a catch 47 extended therefrom for engaging with the cavity 35 of the cover 3 so as to retain the door 4 in the closed position.

Figure 5:
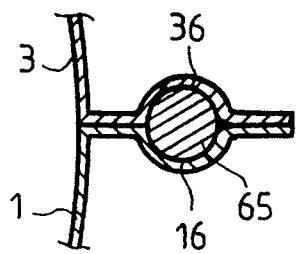
FIG. 5 is a partial cross sectional view illustrating the coupling of the base and the cover.

Two grids 5 each has the upper and lower edges engaged with the slots 37, 17 of the cover 3 and the base 1 respectively so as to form two windows for enclosing the accesses 12, 32 of the cover and the base, in which air is allowed to enter into the cage via the grids 5. Two lids 6 each has two halves 61, 63 pivotally coupled together by sleeves 62, 64 and shaft 65. The end portions of the shafts 65 are rotatably received in the recesses 16, 36, as best shown in FIG. 5. The two halves 61, 63 of the lids 6 are engaged with the bars 18, 38 and are coupled to the bars by bolts 7 each including a tapered end 71 having a split 72 formed therein, as best shown in FIG. 6. The cover 3 and the base 1 are also coupled together by bolts 7.

In operations, pets are allowed to enter into the cage via the door 4 and the discharge of the pets can be attached collected within the pan 2. The lids 6 can be attached to the cage in accordance with the weather, for example, during winter, the lids 6 are secured to the cage for enclosing the windows 5 as shown in FIG. 6, and during summer, the lids 6 can be disengaged from the case such that may flow into the cage easily. However, as shown in FIG. 4, part of the lids 6 can also be opened in order to allow part of the windows 5 opened. The cage can be easily carried by the handle 39.

Figure 7:
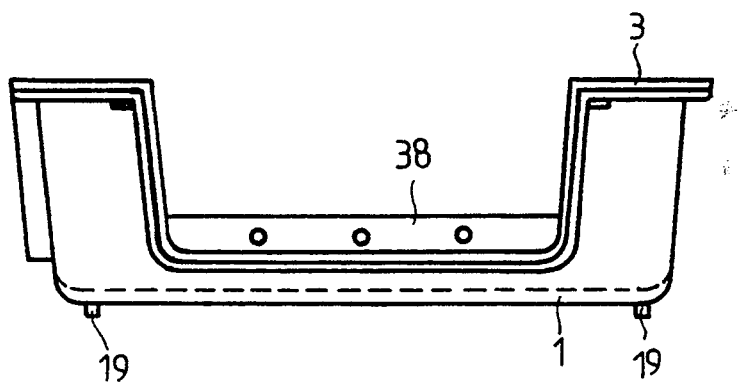
FIG. 7 is a schematic view illustrating the engagement of the cover within the base.

Referring next to FIG. 7, when the base 1 and the cover 3 are disengaged from each other, the cover 3 can be received within the base 1, and the other parts can be received within the cover 3. This greatly reduces the volume of the cage and this greatly facilitates the transportation purposes thereof.

Although this invention has been described with a certain degree of particularity, it is to be understood that the present disclosure has been made by way of example only and that numerous changes in the detailed construction and the combination and arrangement of parts may be resorted to without departing from the spirit and scope of the invention as hereinafter claimed.

I claim:

1. A cage comprising:

a base including a front portion having a first opening formed therein, two side portions each having a first access formed therein, two first recesses oppositely formed in an upper portion of each of said first accesses, a first slot and a first bar formed in a bottom portion of each of said first accesses;

a cover including a front portion having a second opening formed there in and two side portions each having a second access formed therein, two second recesses oppositely formed in a lower portion of each of said second accesses, a cavity formed in one side of said second opening, a second slot and a second bar formed in an upper portion of each of said second accesses;

a door including a plurality of holes formed therein and pivotally coupled between said base and said cover for closing said first opening and said second opening, a board fixed on said door, a knob having an extension engaged into said board and said door, said knob including a catch extended therefrom for engaging will said cavity of said cover so as to retain said door in a closed position;

two grids engaged with said first slots of said base and said second slots of said cover for closing off said first accesses and said second accesses and for allowing air to enter into said cage, and two lids, each including two halves pivotally coupled together by a shaft, said shaft including two end portions rotatably received in said first and second recesses, said two halves of said lids being engaged with said first bars and said second bars, and means for affixing said two halves of said lids to said first bars and said second bars.

2. A cage according to claim 1, wherein said base includes an oblong hole formed in said front portion thereof and located below said first opening, a pan inserted into said base via said oblong hole and located within a bottom portion of said base, and a grate disposed in said pan.

* * * * *